US011163118B2

(12) United States Patent
Shimada et al.

(10) Patent No.: US 11,163,118 B2
(45) Date of Patent: Nov. 2, 2021

(54) OPTICAL MODULATION DEVICE

(71) Applicant: SUMITOMO OSAKA CEMENT CO., LTD., Tokyo (JP)

(72) Inventors: Makoto Shimada, Tokyo (JP); Tokutaka Hara, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/041,306

(22) PCT Filed: Mar. 7, 2019

(86) PCT No.: PCT/JP2019/009141
§ 371 (c)(1),
(2) Date: Sep. 24, 2020

(87) PCT Pub. No.: WO2019/188093
PCT Pub. Date: Oct. 3, 2019

(65) Prior Publication Data
US 2021/0026073 A1 Jan. 28, 2021

(30) Foreign Application Priority Data
Mar. 27, 2018 (JP) .............................. JP2018-060874

(51) Int. Cl.
G02B 6/27 (2006.01)
G02B 6/132 (2006.01)
(Continued)

(52) U.S. Cl.
CPC ........... *G02B 6/2773* (2013.01); *G02B 6/132* (2013.01); *G02F 1/065* (2013.01); *G02F 1/2252* (2013.01); *G02B 2006/12116* (2013.01)

(58) Field of Classification Search
CPC .................. G02B 6/2773; G02B 6/132; G02B 2006/12116; G02F 1/065; G02F 1/2252; G02F 1/035; G02F 1/03
See application file for complete search history.

(56) References Cited

U.S. PATENT DOCUMENTS

| 8,570,644 | B2* | 10/2013 | Oguri ...................... G02F 1/035 |
| | | | 359/303 |
| 9,703,169 | B2* | 7/2017 | Okamura ............... G02F 1/2255 |
| 10,598,862 | B2* | 3/2020 | Miyazaki ................. G02B 6/32 |

FOREIGN PATENT DOCUMENTS

| JP | 2000-214328 A | 8/2000 |
| JP | 2014-149398 A | 8/2014 |
| JP | 2014-186127 A | 10/2014 |

OTHER PUBLICATIONS

Machine generated English translation of JP2014-186127(A) (Year: 2021).*

(Continued)

*Primary Examiner* — John Bedtelyon
(74) *Attorney, Agent, or Firm* — Merchant & Gould P.C.

(57) ABSTRACT

An optical modulation device includes: a substrate which extends in one direction; an optical waveguide provided on the substrate in a longitudinal direction of the substrate; a half-wave plate; and a combining element which faces an end portion of the substrate and combines two types of linearly polarized light, which have vibration planes orthogonal to each other, to generate composite light, in which the optical waveguide modulates the linearly polarized light which propagates through an inside of the optical waveguide to generate first polarized light and second polarized light, which are linearly polarized light, the half-wave plate is provided at a position to which the second polarized light enters, the combining element includes a transparent base body, a first optical film provided on a first (Continued)

surface of the transparent base body, and a second optical film provided on a second surface which faces the first surface of the transparent base body, the first optical film transmits one of the first polarized light and the second polarized light, which is emitted through the half-wave plate, and reflects the other light, the second optical film reflects the one light, and the composite light is reflected in a direction intersecting the longitudinal direction.

18 Claims, 3 Drawing Sheets

(51) Int. Cl.
　　　*G02F 1/065*　　　(2006.01)
　　　*G02F 1/225*　　　(2006.01)
　　　*G02B 6/12*　　　(2006.01)

(56) References Cited

OTHER PUBLICATIONS

International Search Report for PCT/JP2019/009141 (dated May 14, 2019).

\* cited by examiner

OPTICAL MODULATION DEVICE

TECHNICAL FIELD

The present invention relates to an optical modulation device.

This application is a U.S. National Stage Application under 35 U.S.C. § 371 of International Patent Application No. PCT/JP2019/009141, filed on Mar. 7, 2019, which claims the right of priority to Japanese Patent Application No. 2018-060874 filed in Japan on Mar. 27, 2018, the disclosures of all of which are hereby incorporated by reference in their entireties.

BACKGROUND ART

In the related art, an optical modulation device using a Mach-Zehnder optical waveguide has been widely used in the field of optical communication or optical measurement.

As such an optical modulation device, a configuration is known in which incident light is split into two and the respective split lights are modulated, and then superimposed on each other and emitted. In the optical modulation device disclosed in Patent Literature No. 1, a configuration is made such that light enters from one end side of a substrate to an optical waveguide formed in a longitudinal direction of the substrate and the modulated light is emitted from the other end side of the substrate.

CITATION LIST

Patent Literature

Patent Literature No. 1: Japanese Laid-open Patent Publication No. 2014-149398

SUMMARY OF INVENTION

Technical Problem

In the optical modulation device disclosed in Patent Literature No. 1, optical fibers are connected to one side and an other side in the longitudinal direction of the substrate. Therefore, in the surroundings of the optical modulation device, a configuration which is connected to the optical modulation device also needs to be disposed in the longitudinal direction of the substrate, and thus the degree of freedom of disposition is reduced.

Further, in recent years, for the purpose of high integration of functions or space saving, a device configuration tends to be downsized as in an optical module in which a fiber connector such as CFP2 standardized by IEEE can be directly attached and detached. Therefore, there has been a demand for a small-sized optical modulation device that can be housed in an outer packaging according to the standard.

The present invention has been made in view of such circumstances and has an object to provide a downsized novel optical modulation device.

Solution to Problem

In order to solve the above problems, according to a first aspect of the present invention, there is provided an optical modulation device including: a substrate which extends in one direction; an optical waveguide which is provided on the substrate in a longitudinal direction of the substrate; a half-wave plate; and a combining element which faces an end portion of the substrate and combines two types of linearly polarized light, which have vibration planes orthogonal to each other, to generate composite light, in which the optical waveguide modulates linearly polarized light, which propagate through an inside of the optical waveguide, to obtain first polarized light and second polarized light which are linearly polarized light, the half-wave plate is provided at a position to which the second polarized light enters, the combining element includes a transparent base body, a first optical film which is provided on a first surface of the transparent base body, and a second optical film which is provided on a second surface which faces the first surface of the transparent base body, the first optical film transmits one of the first polarized light and the second polarized light, which is emitted through the half-wave plate, and reflects the other light, the second optical film reflects the one light, and the composite light is reflected in a direction intersecting the longitudinal direction.

The first aspect of the present invention preferably includes the following features. Two or more of the following features may be combined with each other as long as there is no problem.

In the above aspect of the present invention, a configuration may be adopted in which the half-wave plate is provided on an optical path of the second polarized light, which is emitted from the end portion of the substrate, and is located between the end portion and the combining element, and with respect to an optical path of the first polarized light and the optical path of the second polarized light which are emitted from the end portion, the combining element reflects the composite light toward an optical path side of the second polarized light.

In the above aspect of the present invention, a configuration may be adopted in which the first optical film transmits a part of the one light and reflects a remaining part of the one light, and a light-receiving element is provided at a position to which the one light which is reflected by the first optical film enters.

In the above aspect of the present invention, a configuration may be adopted in which the first optical film reflects a part of the other light and transmits a remaining part of the other light, the second optical film reflects the one light and transmits the other light, and a light-receiving element is provided at a position to which the other light which is transmitted through the second optical film enters.

In the above aspect of the present invention, a configuration may be adopted in which the second optical film is a reflection mirror that reflects the one light and the other light.

In the above aspect of the present invention, a configuration may be adopted in which the first optical film reflects a part of the other light and transmits a remaining part of the other light, and a light-receiving element is provided at a position to which the other light which is reflected by the second optical film enters.

In the above aspect of the present invention, a configuration may be adopted in which the optical modulation device further includes an angle adjustment part which is provided between the end portion of the substrate and the combining element to adjust incident angles of the first polarized light and the second polarized light with respect to the combining element 40B.

Advantageous Effects of Invention

According to the present invention, it is possible to provide a downsized novel optical modulation device.

DESCRIPTION OF EMBODIMENTS

Hereinafter, preferred examples of an optical modulation device according to the present invention will be described. The following description is description specifically made for better understanding of the gist of the invention, and does not limit the present invention unless otherwise specified. The number, a position, a size, a length, a numerical value, or the like can be changed, omitted, or added within a scope which does not depart from the present invention.

First Embodiment

Hereinafter, an optical modulation device according to a first embodiment of the present invention will be described with reference to FIGS. 1 to 3.

In all the following drawings, in order to make the drawings easy to see, all or a part of the dimensions, ratios, and the like of the respective constituent elements are appropriately varied.

Figure 1:
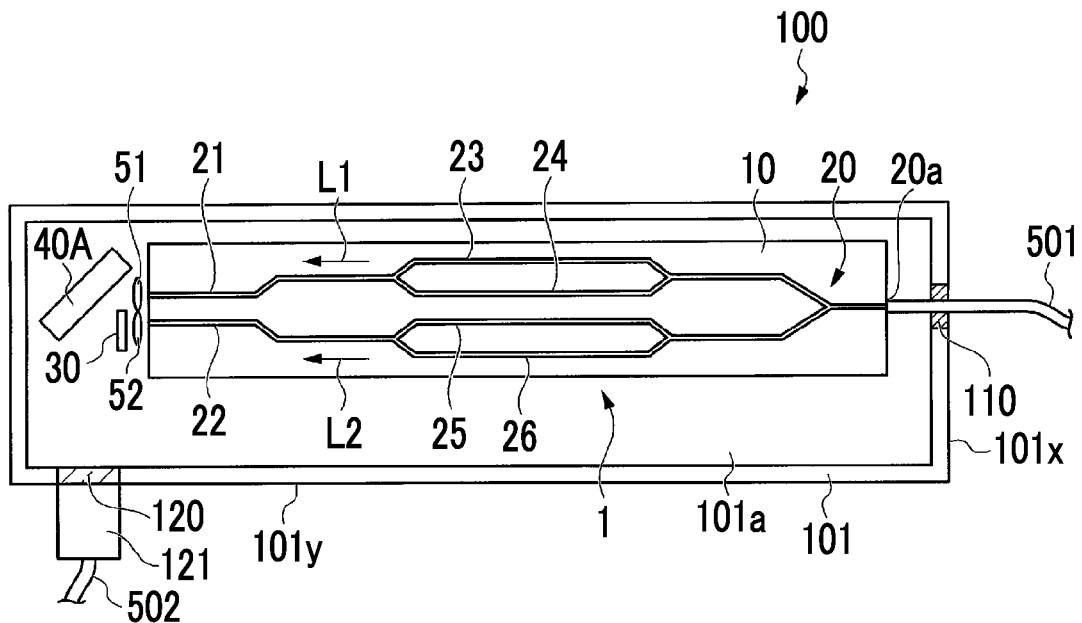
FIG. 1 is a schematic explanatory diagram of an optical device 100 having an optical modulation device 1.

FIG. 1 is a schematic explanatory diagram of an optical device 100 having an optical modulation device 1. FIG. 2 is a partially enlarged view of the optical modulation device 1. A double-headed arrow and a double circle shown in FIG. 2 indicate vibration directions of linearly polarized light, and the double-headed arrow and the double circle indicate that the vibration directions of the linearly polarized light are orthogonal to each other.

(Optical Modulation Device)

The optical modulation device 1 includes a substrate 10, an optical waveguide 20, a half-wave plate 30, a combining element 40A, a first collimating lens 51, and a second collimating lens 52.

The substrate 10 is a plate-shaped member having a rectangular shape when viewed in a plan view and using a material having an electro-optic effect as a forming material. The material for forming the substrate 10 can be optionally selected. However, a crystalline material such as lithium niobate (LiNbO3: LN), lithium tantalate (LiTaO3), or lanthanum zirconate titanate (PLZT) can be preferably used as the material for forming the substrate 10.

In a case where the crystalline material is used as the material for forming the substrate 10, an optical waveguide can be formed by using a known technique such as thermal diffusion of metal such as Ti, rib formation by etching, or proton exchange with respect to a plate material using the crystalline material as a forming material.

Further, as the material for forming the substrate 10, an organic electro-optical polymer material in which a nonlinear optical organic compound is dispersed in a polymer material can also be used.

In a case where the organic electro-optical polymer material is used as the material for forming the substrate 10, first, silicon, quartz, or the like is prepared as a base material. Thereafter, a high refractive index layer and a low refractive index layer are laminated on the base material by using two or more types of polymer materials having different refractive indexes.

Further, an optical waveguide is patterned by performing forming by etching or imprinting on the high refractive index layer or the low refractive index layer.

At this time, the substrate 10 can be formed by using an organic electro-optical polymer material for at least a part of the high refractive index layer and the low refractive index layer.

The optical waveguide 20 is formed on the substrate 10 in the longitudinal direction of the substrate 10.

As shown in FIG. 1, the optical waveguide 20 included in the optical device 100 of this embodiment is a Mach-Zehnder optical waveguide.

The optical waveguide 20 has a nested structure in which two optical waveguides 21 and 22 extending in the longitudinal direction of the substrate 10 are provided in both arms.

Each of the optical waveguides 21 and 22 is a Mach-Zehnder optical waveguide.

The optical waveguide 21 has two parallel first waveguide 23 and second waveguide 24 extending in the longitudinal direction of the substrate 10.

The optical waveguide 22 has two parallel third waveguide 25 and fourth waveguide 26 extending in the longitudinal direction of the substrate 10.

The configuration of the optical waveguide 20 shown in this embodiment is an example, and in the optical modulation device according to the present invention, optical waveguides having various configurations can be adopted.

The polarized wave (linearly polarized light) entered from one end portion 20a of the optical waveguide 20 to the inside of the optical waveguide 20 is branched to and propagates through the optical waveguide 21 and the optical waveguide 22, respectively. The linearly polarized lights propagating through the optical waveguides 21 and 22 have the same vibration direction.

The optical modulation device 1 can preferably have a signal electrode and a ground electrode (not shown) at positions which do not overlap the optical waveguides configuring the optical waveguides 21 and 22 in the visual field (plan view) from a normal direction to the substrate 10. The signal electrode and the ground electrode cause the optical waveguide 20 to generate an electro-optic effect due to an electric field applied between the signal electrode and the ground electrode, and change the refractive index of the optical waveguide 20. In this way, it is possible to perform the modulation of the linearly polarized light propagating through the optical waveguide 20.

The types of the signal electrode and the ground electrode are not particularly limited.

For example, in an electro-optical element using a crystal substrate such as LiNbO3 as the substrate 10, a coplanar line is often adopted. Further, in an electro-optical element using a substrate made of an organic electro-optical polymer material as the substrate 10, a micro-strip line is often adopted.

The linearly polarized light propagating through the optical waveguide 21 becomes first polarized light L1 due to the modulation by the signal electrode and the ground electrode. The first polarized light L1 is emitted from an end portion 21a of the optical waveguide 21 and converted into parallel light by the first collimating lens 51.

The linearly polarized light propagating through the optical waveguide 22 becomes second polarized light L2 due to the modulation by the signal electrode and the ground electrode. The second polarized light L2 is emitted from an end portion 22a of the optical waveguide 22 and converted into parallel light by the second collimating lens 52.

The first polarized light L1 which is emitted through the first collimating lens 51 and the second polarized light L2 which is emitted through the second collimating lens 52 are set so as to become, for example, parallel light.

The half-wave plate 30 is a plate-shaped member using a birefringent material as a forming material.

The half-wave plate 30 is provided at a position to which the second polarized light L2 enters. The optical axis of the half-wave plate 30 intersects the vibration plane of the entered second polarized light L2 at 45°. Further, the half-wave plate 30 causes a phase difference of 180° to be generated between two polarization components orthogonal to each other in the second polarized light L2. In this way, the second polarized light L2 which enters to the half-wave plate 30 is emitted with the vibration plane rotated by 90°.

That is, the vibration directions of the first polarized light L1 and the second polarized light L2 emitted through the half-wave plate 30 are orthogonal to each other.

The combining element 40A has a transparent base body 41, a first optical film 411 formed on a first surface 41a of the transparent base body 41, and a second optical film 412 formed on a second surface 41b.

The transparent base body 41 is a plate-shaped member using a material having optical transparency as a forming material. As the material for forming the transparent base body 41, an inorganic material such as glass or quartz, or a resin material such as polymethylmethacrylate or polycarbonate can be used.

The first optical film 411 is a dielectric multilayer film that transmits one of the linearly polarized lights orthogonal to each other and reflects the other. The first optical film 411 of this embodiment transmits the first polarized light L1 and reflects the second polarized light L2.

In this way, the first polarized light L1 is refracted at the first surface 41a of the transparent base body 41 and entered to the inside of the transparent base body 41.

Further, the second polarized light L2 is reflected in the direction intersecting the longitudinal direction of the substrate 10. In the drawing, the reflection direction of the second polarized light L2 is a direction of 90° with respect to the longitudinal direction of the substrate 10.

The second optical film 412 reflects at least the first polarized light L1 transmitted through the first optical film 411. The second optical film 412 may be a dielectric multilayer film having a property of reflecting the first polarized light L1 or a total reflection mirror.

In this way, the first polarized light L1 propagating through the inside of the transparent base body 41 is reflected by the second optical film 412 and travels toward the first optical film 411. Since the first optical film 411 has a property of transmitting the first polarized light L1, the first polarized light L1 is refracted at the first surface 41a and emitted to the outside of the combining element 40A.

At this time, the configuration of the combining element 40A is set such that a position P where the first polarized light L1 is emitted through the combining element 40A and a position P where the second polarized light L2 which is emitted through the half-wave plate 30 enters to the combining element 40A are the same position. Specifically, in the combining element 40A, at least one of the inclination angle of the combining element 40A with respect to an end surface 10a of the substrate 10 and the thickness of the combining element 40A is set such that the position P where the first polarized light L1 is emitted and the position P where the second polarized light L2 enters to the combining element 40A are the same position.

In this way, the first polarized light L1 is emitted in the same direction as the second polarized light L2, and composite light L in which the first polarized light L1 and the second polarized light L2 are combined is obtained.

That is, the combining element 40A has a function of combining the composite light L from the first polarized light L1 and the second polarized light L2 and changing the emission direction of the composite light L to the direction intersecting the longitudinal direction of the substrate 10.

Since the first polarized light L1 transmits through the inside of the transparent base body 41, an optical path length difference is generated between the first polarized light L1 and the second polarized light L2. Therefore, an optical compensation plate for compensating for the optical path length difference between the first polarized light L1 and the second polarized light L2 may be provided on the optical path of the second polarized light L2 from the end portion 22a of the optical waveguide 22 to the position P. The optical compensation plate may be integrated with the half-wave plate 30.

The optical modulation device 1 of this embodiment is configured as described above.

The optical modulation device 1 of this embodiment has the combining element 40A that realizes the forming of the composite light L and the emission of the composite light L in the direction intersecting the longitudinal direction of the substrate 10, with a single member, as described above. Therefore, in the optical modulation device 1, the number of members is reduced as compared with an optical modulation device in which the combining of the first polarized light L1 and the second polarized light L2 and the reflection of the composite light L are performed by separate members, and therefore, the downsizing of the device can be attained.

Further, the combining element 40A has a configuration in which the optical films are formed on both surfaces of the plate-shaped transparent base body 41, and the number of parts is small. Further, the combining element 40A does not require polishing to a special shape or bonding of a plurality of members when being formed.

Therefore, the yield in manufacturing the combining element 40A is high. Further, by using the combining element 40A which is a single member, the number of parts of the optical modulation device 1 is reduced, and it is easy to downsize the entire device configuration.

Therefore, according to the optical modulation device 1 having the configuration as described above, it is possible to provide a downsized novel optical modulation device.

(Optical Device)

The optical device 100 preferably includes the optical modulation device 1 described above, a package case 101, a transmission part 120, and a light condensing part 121.

The package case 101 is a box-shaped member having a bottom plate and having a rectangular shape when viewed in a plan view. The optical modulation device 1 described above is housed in a storage space 101a of the package case 101.

A mounting part 110 is provided on a side surface 101x in the longitudinal direction of the package case 101. An optical fiber 501 is inserted into the mounting part 110 and sealed with solder. The optical fiber 501 is connected to the end portion 20a of the optical waveguide 20. Further, the optical fiber 501 is connected to an external device of the optical modulation device 1.

The transmission part 120 is provided on a side surface 101y in a lateral direction of the package case 101. The transmission part 120 is a transmission window provided using an optical transparent forming material. As the material for forming the transmission part 120, an inorganic material such as glass or quartz, or a resin material such as polymethylmethacrylate or polycarbonate can be given as an example.

The light condensing part 121 is provided on the outside of the side surface 101y of the package case 101 so as to be in optical contact with the transmission part 120. The light condensing part 121 condenses the composite light L which is emitted through the combining element 40A and transmits through the transmission part 120. The condensed composite light L enters to an optical fiber 502 connected to the light condensing part 121 and is transmitted to an external device.

In the optical device 100 of this embodiment, since the optical modulation device 1 described above is used, it becomes possible to use, as the package case 101, a small-sized package case that satisfies the IEEE CFP2 standard, for example. In this way, the small-sized optical device 100 can be realized.

The optical device to which the optical modulation device 1 is applied is not limited to the optical device 100 described above. FIG. 3 is an explanatory diagram showing an optical device 200 according to a modification example of this embodiment and is a diagram corresponding to FIG. 1.

The optical device 200 preferably includes the optical modulation device 1 described above, the package case 101, the transmission part 120, the light condensing part 121, and a planar optical waveguide (PLC) 150.

The mounting part 110 and the transmission part 120 are provided on the side surface 101y in the lateral direction of the package case 101. The optical fiber 501 which is inserted into the mounting part 110 is connected to the PLC 150. In this way, the optical fiber 501 is connected to the end portion 20a of the optical waveguide 20 through the PLC 150.

The PLC 150 has an optical waveguide curved when viewed in a plan view and formed inside, and emits an optical signal entered to an end surface 150a of the PLC 150 from a different position on the end surface 150a. The emitted optical signal enters to the end portion 20a of the optical waveguide 20.

In the optical device 200, by using the optical modulation device 1 described above, both the mounting part 110 and the transmission part 120 are provided on the side surface 101y in the lateral direction of the package case 101. Therefore, the optical fibers 501 and 502 are connected to the optical device 200 from the side surface 101y. In this way, it is possible to realize a small-sized optical device.

Second Embodiment

Figure 2:
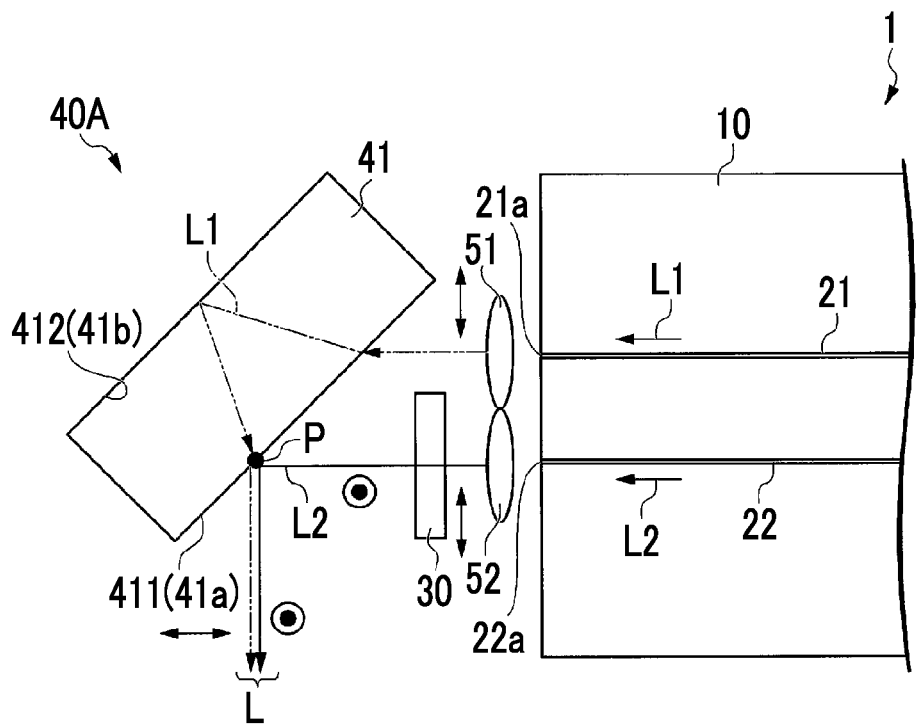
FIG. 2 is a schematic partially enlarged view of the optical modulation device 1.
Figure 3:
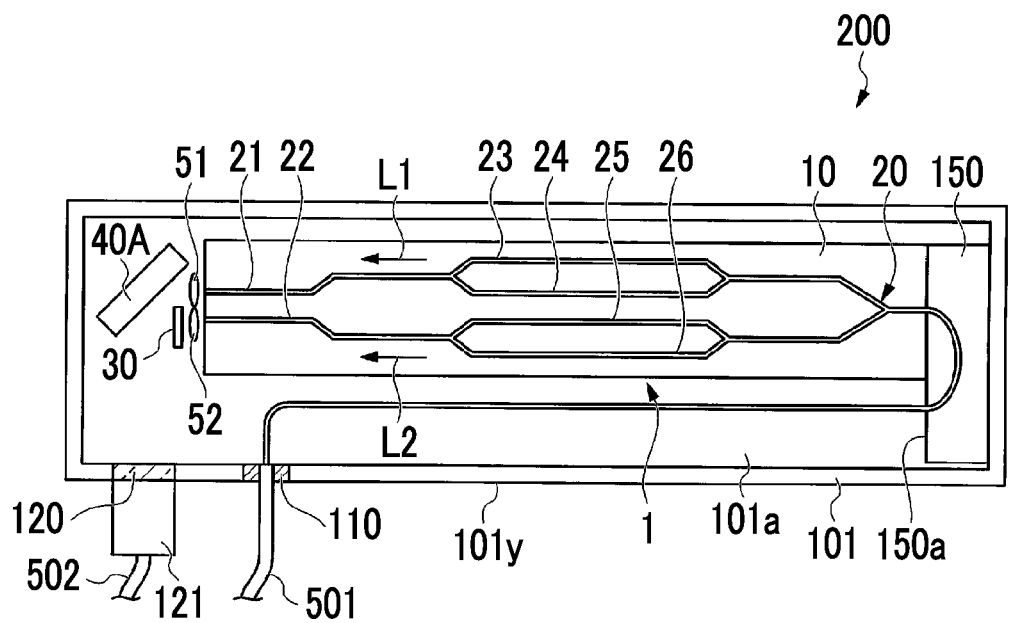
FIG. 3 is a schematic explanatory diagram showing an optical device 200 according to a modification example of the present embodiment.
Figure 4:
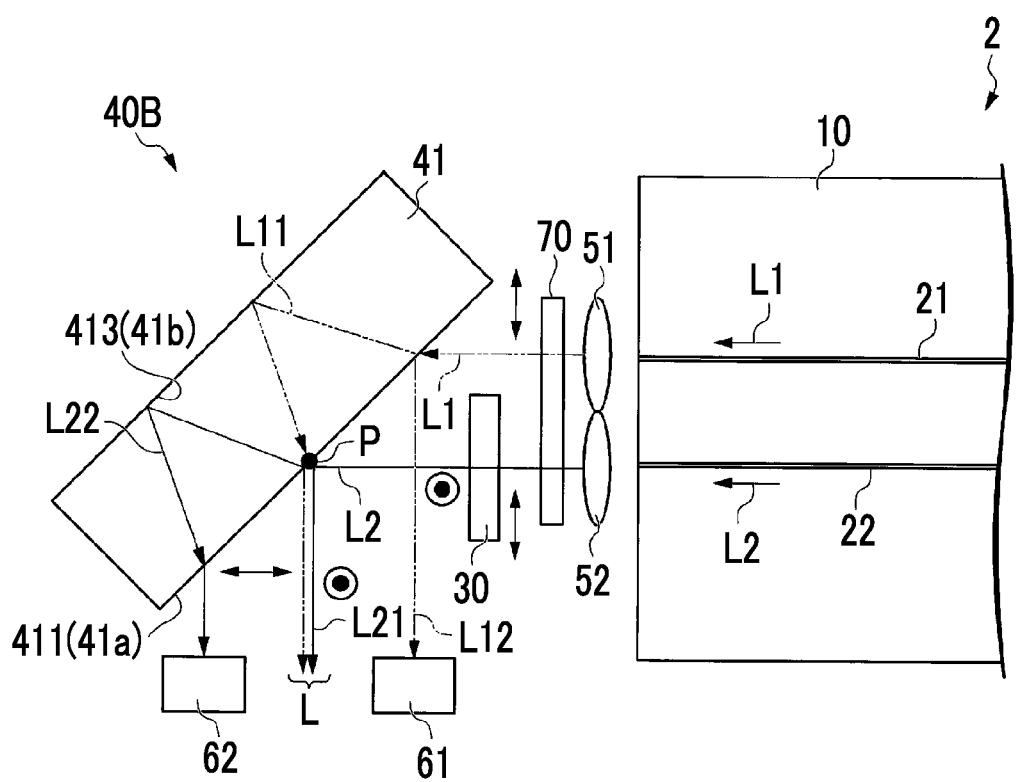
FIG. 4 is a schematic explanatory diagram of an optical modulation device 2 according to a second embodiment of the present invention.

FIG. 4 is an explanatory diagram of an optical modulation device 2 according to a second embodiment of the present invention and is a diagram corresponding to FIG. 2. In the following embodiments, constituent elements common to the embodiment described above are denoted by the same reference numerals, and detailed description of the constituent elements is omitted.

The optical modulation device 2 preferably includes the substrate 10, the optical waveguide 20, the half-wave plate 30, a combining element 40B, the first collimating lens 51, the second collimating lens 52, a first light-receiving element 61, a second light-receiving element 62, and an angle adjustment part 70. The first light-receiving element 61 and the second light-receiving element 62 correspond to a "light-receiving element" in the present invention.

The combining element 40B has the transparent base body 41, the first optical film 411 formed on the first surface 41a of the transparent base body 41, and a second optical film 413 formed on the second surface 41b.

The first optical film 411 is a dielectric multilayer film that transmits one of the linearly polarized lights orthogonal to each other and reflects the other. The first optical film 411 of this embodiment transmits the first polarized light L1 and reflects the second polarized light L2. The second optical film 413 is a total reflection mirror.

The dielectric multilayer film that is the first optical film 411 has an angle dependency in which reflectance and transmittance with respect to incident light change in a case where the incident angle of the incident light is changed. That is, the first optical film 411 transmits the first polarized light L1 and reflects the second polarized light L2 in a case where it is disposed at an ideal angle with respect to the ray axis of the parallel light of the first polarized light L1 which is emitted through the first collimating lens 51 and the optical axis of the parallel light of the second polarized light L2 which is emitted through the second collimating lens 52.

In contrast, in the optical modulation device 2 of the second embodiment, the angle adjustment part 70 that tilts the optical axis of the first polarized light L1 and the optical axis of the second polarized light L2 is provided on the optical path between the half-wave plate 30 and the second collimating lens 52 so as to straddle the optical path of the first polarized light L1 and the optical path of the second polarized light L2.

As the angle adjustment part 70, a wave plate with an optical axis inclined or a transparent plate member having a trapezoidal shape when viewed in a plan view can be exemplified. The angle at which the optical axes of the first polarized light L1 and the second polarized light L2 are tilted by the angle adjustment part 70 may be appropriately set according to a design. The angle is about 5°, for example.

In this case, the optical axes of the first polarized light L1 and the second polarized light L2 which enters to the angle adjustment part 70 are inclined when the first polarized light L1 and the second polarized light L2 are emitted from the angle adjustment part 70. In this way, the incident angles of the first polarized light L1 and the second polarized light L2 with respect to the combining element 40B become angles deviated from the ideal angles for causing the first optical film 411 to transmit the first polarized light L1 and reflect the second polarized light L2. The incident angles of the first polarized light L1 and the second polarized light L2 with respect to the combining element 40B can be easily controlled by adjusting the configuration of the angle adjustment part 70 and the posture of the angle adjustment part 70.

In this way, the first polarized light L1 is branched into light L11, which is refracted at the first surface 41a of the transparent base body 41 and enters to the inside of the transparent base body 41, and light L12, which is reflected in the direction intersects the longitudinal direction of the substrate 10 by the first surface 41a of the transparent base body 41.

The polarization states of the first polarized light L1, the light L11, and the light L12 are the same. Further, on the first surface 41a, most of the first polarized light L1 (for example, 95% of the amount of light of the first polarized light L1) enters to the inside of the transparent base body 41 to become the light L11, and a slight amount of light (for example, 5% of the amount of light of the first polarized light L1) is reflected by the first surface 41a to becomes the light L12. The first polarized light L1 is branched at such a ratio, whereby the loss of the amount of light due to the branching is reduced.

Further, the second polarized light L2 is branched into light L21, which is reflected in the direction intersecting the longitudinal direction of the substrate 10, and light L22, which is refracted at the first surface 41a of the transparent base body 41 and enters to the inside of the transparent base body 41.

The polarization states of the second polarized light L2, the light L21, and the light L22 are the same. Further, on the first surface 41a, most of the second polarized light L2 (for example, 95% of the amount of light of the first polarized light L1) is reflected by the transparent base body 41 to become the light L21, and a slight amount of light (for example, 5% of the amount of light of the second polarized light L2) enters to the inside of the first surface 41a to becomes the light L22. The second polarized light L2 is branched at such a ratio, whereby the loss of the amount of light due to the branching is reduced.

At this time, the optical modulation device 2 is configured such that the position P where the light L11 is emitted through the combining element 40B and the position P where the light L21 enters to the combining element 40B are substantially the same position. In this way, the light L11 is emitted in the same direction as the light L21, and the composite light L in which the light L11 and the light L21 are combined is obtained.

Further, the light L22 propagating through the inside of the transparent base body 41 is reflected by the second surface 41b (the second optical film 413) and travels toward the first optical film 411. Since the first optical film 411 has a property of transmitting the light L22 (the second polarized light L2), the light L22 is refracted at the first surface 41a and emitted to the outside of the combining element 40B.

The first light-receiving element 61 is provided at a position to which the light L11 reflected by the first surface 41a enters. The second light-receiving element 62 is provided at a position to which the light L22 which is refracted at the first surface 41a and emitted to the outside of the combining element 40B enters.

Each of the first light-receiving element 61 and the second light-receiving element 62 can monitor the amount of light of the incident light and generate a monitor signal having a current value proportional to the amount of light. The first light-receiving element 61 and the second light-receiving element 62 are, for example, diodes using a semiconductor such as germanium or gallium as a forming material.

The substrate 10 can include a bias electrode (not shown) to which a bias signal having a bias voltage that is a specific operating point is applied in order to realize a correct operation. The bias signal is supplied from the outside of the package case to the substrate 10 separately from a data signal.

The monitor signals generated by the first light-receiving element 61 and the second light-receiving element 62 are used for feedback control that controls the voltage value of the bias signal such that an error from a reference voltage determined in advance is reduced. In this way, in the optical modulation device 2, it is possible to realize highly accurate bias control.

Also with the optical modulation device 2 having the configuration as described above, it is possible to provide a downsized novel optical modulation device.

In the optical modulation device 2 of this embodiment, the angle adjustment part 70 is provided to adjust the incident angles of the first polarized light L1 and the second polarized light L2 with respect to the combining element 40B. However, there is no limitation to this. The incident angles of the first polarized light L1 and the second polarized light L2 with respect to the combining element 40B may be adjusted by adjusting the posture of the combining element 40B.

Third Embodiment

Figure 5:
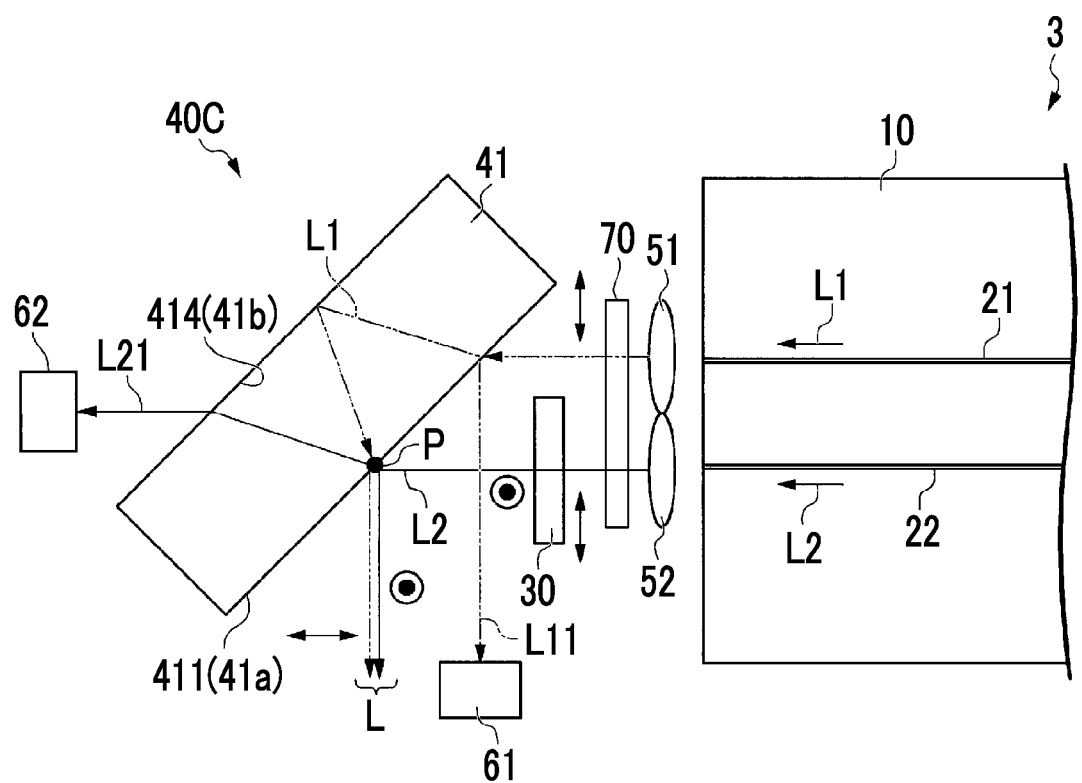
FIG. 5 is a schematic explanatory diagram of an optical modulation device 3 according to a third embodiment of the present invention.

FIG. 5 is an explanatory diagram of an optical modulation device 3 according to a third embodiment of the present invention and is a diagram corresponding to FIGS. 2 and 4.

The optical modulation device 3 preferably includes the substrate 10, the optical waveguide 20, the half-wave plate 30, a combining element 40C, the first collimating lens 51, the second collimating lens 52, the first light-receiving element 61, and the second light-receiving element 62.

The combining element 40C has the transparent base body 41, the first optical film 411 formed on the first surface 41a of the transparent base body 41, and a second optical film 414 formed on the second surface 41b.

The first optical film 411 is a dielectric multilayer film that transmits one of the linearly polarized lights orthogonal to each other and reflects the other. The first optical film 411 of this embodiment transmits the first polarized light L1 and reflects the second polarized light L2. The second optical film 413 is a dielectric multilayer film having a property of reflecting the first polarized light L1 and transmitting the second polarized light L2.

In the optical modulation device 3 of this embodiment, similar to the optical modulation device 2 described above, the first polarized light L1 is branched into the light L11 which is refracted at the first surface 41a of the transparent base body 41 and enters to the inside of the transparent base body 41 and the light L12 which is reflected in the direction intersecting the longitudinal direction of the substrate 10 by the first surface 41a of the transparent base body 41.

Further, the second polarized light L2 is branched into light L21 which is reflected in the direction intersecting the longitudinal direction of the substrate 10 and light L22 which is refracted at the first surface 41a of the transparent base body 41 and enters to the inside of the transparent base body 41. The light L22 transmits through the second surface 41b.

At this time, the optical modulation device 3 is configured such that the position P where the light L11 is emitted through the combining element 40C and the position P where the light L21 enters to the combining element 40C are substantially the same position. In this way, the light L11 is emitted in the same direction as the light L21, and the composite light L in which the light L11 and the light L21 are combined is obtained.

The first light-receiving element 61 is provided at a position to which the light L11 reflected by the first surface 41a enters. The second light-receiving element 62 is provided at a position to which the light L22 transmitted through the second surface 41b enters.

The first light-receiving element 61 and the second light-receiving element 62 preferably generate monitor signals which are used for the feedback control of the bias signal, as in the optical modulation device 2 described above.

Also with the optical modulation device 3 having the configuration as described above, it is possible to provide a downsized novel optical modulation device.

Further, in the optical modulation device 3 having the configuration as described above, the second light-receiving element 62 can be disposed on the second surface 41b side of the combining element 40C. In this way, it is possible to effectively use the space on the second surface 41b side of the combining element 40C.

The preferred embodiment examples of the present invention have been described above with reference to the accompanying drawings. However, it goes without saying that the present invention is not limited to these examples. The shapes, combinations, or the like of the respective constituent members shown in the examples described above are merely examples, and various modifications can be made based on design requirements or the like within a scope which does not depart from the gist of the present invention.

INDUSTRIAL APPLICABILITY

A downsized novel optical modulation device is provided.

REFERENCE SIGNS LIST 1, 2, 3: optical modulation device
10: substrate
L11, L12, L21, L22: light
20: optical waveguide
20a, 21a, 22a: end portion
21, 22: optical waveguide
23: first waveguide
24: second waveguide
25: third waveguide
26: fourth waveguide
30: half-wave plate
40A, 40B, 40C: combining element
41: transparent base body
41a: first surface
41b: second surface
51: first collimating lens
52: second collimating lens
61: first light-receiving element (light-receiving element)
62: second light-receiving element (light-receiving element)
70: angle adjustment part
100: optical device
101: package case
101a: storage space of package case
101x: side surface in longitudinal direction of package case
101y: side surface in lateral direction of package case
110: mounting part
120: transmission part
121: light condensing part
150: PLC
150a: end surface of PLC
200: optical device
411: first optical film
412, 413, 414: second optical film
501, 502: optical fiber
L: composite light
L1: first polarized light
L2: second polarized light
P: position

The invention claimed is:

1. An optical modulation device comprising:
a substrate which extends in one direction;
an optical waveguide which is provided on the substrate in a longitudinal direction of the substrate;
a half-wave plate;
a combining element which faces an end portion of the substrate and combines two types of linearly polarized light, which have vibration planes orthogonal to each other, to generate composite light, and
an angle adjustment part,
wherein
the optical waveguide modulates linearly polarized light, which propagates through an inside of the optical waveguide, to generate first polarized light and second polarized light which are linearly polarized light,
the angle adjustment part is provided between the end portion of the substrate and the combining element to adjust incident angles of the first polarized light and the second polarized light with respect to the combining element,
the half-wave plate is provided at a position to which the second polarized light which has passed through the angle adjustment part enters,
the combining element includes
a transparent base body,
a first optical film which is provided on a first surface of the transparent base body, and
a second optical film which is provided on a second surface which faces the first surface of the transparent base body,
the first optical film branches respectively the first polarized light and the second polarized light into light which passes through the first optical film and light which is reflected in a direction which intersects a longitudinal direction of the substrate,
the second optical film reflects respectively the light which is branched from the first polarized light and the second polarized light and transmitted through the first optical film, and
the light, which is branched from the first polarized light, reflected by the second optical film after passing through the first optical film and then emitted from the first optical film, and the light, which is branched from the second polarized light and reflected by the first optical film, are combined.

2. The optical modulation device according to claim 1, wherein the half-wave plate is provided on an optical path of the second polarized light which is emitted from the end portion of the substrate, and is located between the end portion and the combining element, and
with respect to an optical path of the first polarized light and the optical path of the second polarized light which are emitted from the end portion, the combining element reflects the composite light toward an optical path side of the second polarized light.

3. The optical modulation device according to claim 1, wherein the first polarized light and the second polarized light, which are emitted from the optical waveguide, have same vibration directions.

4. The optical modulation device according to claim 1, wherein a vibration directions of the first polarized light which is emitted from the optical waveguide is orthogonal to vibration directions of the second polarized light which is emitted from the half-wave plate.

5. The optical modulation device according to claim 1, wherein the combined light is reflected in a direction intersecting the longitudinal direction of the substrate as the composite light.

6. An optical modulation device comprising:
a substrate which extends in one direction;

an optical waveguide which is provided on the substrate in a longitudinal direction of the substrate;
a half-wave plate; and
a combining element which faces an end portion of the substrate and combines two types of linearly polarized light, which have vibration planes orthogonal to each other, to generate composite light,
wherein
the optical waveguide modulates linearly polarized light, which propagates through an inside of the optical waveguide, to generate first polarized light and second polarized light which are linearly polarized light,
the half-wave plate is provided at a position to which the second polarized light enters,
the combining element includes
a transparent base body,
a first optical film which is provided on a first surface of the transparent base body, and
a second optical film which is provided on a second surface which faces the first surface of the transparent base body,
the first optical film transmits one of the first polarized light and the second polarized light, which is emitted through the half-wave plate, and reflects the other light,
the second optical film reflects the one light which is transmitted through the first optical film, and
the composite light is reflected in a direction intersecting the longitudinal direction,
the first optical film transmits a part of the one light and reflects a remaining part of the one light, and
a light-receiving element is provided at a position to which the one light which is reflected by the first optical film enters.

7. The optical modulation device according to claim 6, further comprising:
an angle adjustment part which is provided between the end portion of the substrate and the combining element to adjust incident angles of the first polarized light and the second polarized light with respect to the combining element.

8. The optical modulation device according to claim 6, wherein the half-wave plate is provided on an optical path of the second polarized light which is emitted from the end portion of the substrate, and is located between the end portion and the combining element, and
with respect to an optical path of the first polarized light and the optical path of the second polarized light which are emitted from the end portion, the combining element reflects the composite light toward an optical path side of the second polarized light.

9. The optical modulation device according to claim 6, wherein the first polarized light and the second polarized light, which are emitted from the optical waveguide, have same vibration directions.

10. The optical modulation device according to claim 6, wherein vibration directions of the first polarized light which is emitted from the optical waveguide is orthogonal to vibration directions of the second polarized light which is emitted from the half-wave plate.

11. An optical modulation device comprising:
a substrate which extends in one direction;
an optical waveguide which is provided on the substrate in a longitudinal direction of the substrate;
a half-wave plate; and
a combining element which faces an end portion of the substrate and combines two types of linearly polarized light, which have vibration planes orthogonal to each other, to generate composite light,
wherein
the optical waveguide modulates linearly polarized light, which propagates through an inside of the optical waveguide, to generate first polarized light and second polarized light which are linearly polarized light,
the half-wave plate is provided at a position to which the second polarized light enters,
the combining element includes
a transparent base body,
a first optical film which is provided on a first surface of the transparent base body, and
a second optical film which is provided on a second surface which faces the first surface of the transparent base body,
the first optical film transmits one of the first polarized light and the second polarized light, which is emitted through the half-wave plate, and reflects the other light,
the second optical film reflects the one light which is transmitted through the first optical film, and
the composite light is reflected in a direction intersecting the longitudinal direction,
the first optical film reflects a part of the other light and transmits a remaining part of the other light,
the second optical film reflects the one light and transmits the other light, and
a light-receiving element is provided at a position to which the other light which is transmitted through the second optical film enters.

12. The optical modulation device according to claim 11, wherein the half-wave plate is provided on an optical path of the second polarized light which is emitted from the end portion of the substrate, and is located between the end portion and the combining element, and
with respect to an optical path of the first polarized light and the optical path of the second polarized light which are emitted from the end portion, the combining element reflects the composite light toward an optical path side of the second polarized light.

13. The optical modulation device according to claim 11, further comprising:
an angle adjustment part which is provided between the end portion of the substrate and the combining element to adjust incident angles of the first polarized light and the second polarized light with respect to the combining element.

14. The optical modulation device according to claim 11, wherein the first polarized light and the second polarized light, which are emitted from the optical waveguide, have same vibration directions.

15. The optical modulation device according to claim 11, wherein vibration directions of the first polarized light which is emitted from the optical waveguide is orthogonal to vibration directions of the second polarized light which is emitted from the half-wave plate.

16. An optical modulation device comprising:
a substrate which extends in one direction;
an optical waveguide which is provided on the substrate in a longitudinal direction of the substrate;
a half-wave plate; and
a combining element which faces an end portion of the substrate and combines two types of linearly polarized light, which have vibration planes orthogonal to each other, to generate composite light,
wherein the optical waveguide modulates linearly polarized light, which propagates through an inside of the optical waveguide, to generate first polarized light and second polarized light which are linearly polarized light, the half-wave plate is provided at a position to which the second polarized light enters, the combining element includes
- a transparent base body,
- a first optical film which is provided on a first surface of the transparent base body, and
- a second optical film which is provided on a second surface which faces the first surface of the transparent base body, the first optical film transmits one of the first polarized light and the second polarized light, which is emitted through the half-wave plate, and reflects the other light, the second optical film reflects the one light which is transmitted through the first optical film, and the composite light is reflected in a direction intersecting the longitudinal direction, the second optical film is a reflection mirror that reflects the one light and the other light, the first optical film reflects a part of the other light and transmits a remaining part of the other light, and a light-receiving element is provided at a position to which the other light which is reflected by the second optical film enters.

17. The optical modulation device according to claim 16, wherein the half-wave plate is provided on an optical path of the second polarized light which is emitted from the end portion of the substrate, and is located between the end portion and the combining element, and with respect to an optical path of the first polarized light and the optical path of the second polarized light which are emitted from the end portion, the combining element reflects the composite light toward an optical path side of the second polarized light.

18. The optical modulation device according to claim 16, further comprising:

an angle adjustment part which is provided between the end portion of the substrate and the combining element to adjust incident angles of the first polarized light and the second polarized light with respect to the combining element.

* * * * *